(12) United States Patent
Stecker et al.

(10) Patent No.: US 12,326,359 B2
(45) Date of Patent: Jun. 10, 2025

(54) PHOTOELECTRIC SENSOR BORESIGHTING IMPROVEMENT

(71) Applicant: Banner Engineering Corp., Minneapolis, MN (US)

(72) Inventors: John Alyn Stecker, Maple Lake, MN (US); Timothy Stuart Gardner, Eden Prairie, MN (US); Eric Karl Lindmark, Shoreview, MN (US); Begad Gamal Elmelligy, Minneapolis, MN (US)

(73) Assignee: Banner Engineering Corp., Minneapolis, MN (US)

( * ) Notice: Subject to any disclaimer, the term of this patent is extended or adjusted under 35 U.S.C. 154(b) by 237 days.

(21) Appl. No.: 17/855,338

(22) Filed: Jun. 30, 2022

(65) Prior Publication Data

US 2023/0009802 A1    Jan. 12, 2023

Related U.S. Application Data

(60) Provisional application No. 63/217,455, filed on Jul. 1, 2021.

(51) Int. Cl.
| | |
|---|---|
| *G01J 1/42* | (2006.01) |
| *G01J 1/02* | (2006.01) |
| *G01J 1/04* | (2006.01) |

(52) U.S. Cl.
CPC ............... *G01J 1/42* (2013.01); *G01J 1/0271* (2013.01); *G01J 1/0411* (2013.01)

(58) Field of Classification Search
CPC ........... G01J 1/42; G01J 1/0271; G01J 1/0411
See application file for complete search history.

(56) References Cited

U.S. PATENT DOCUMENTS

| 4,649,270 A | 3/1987 | Goldenberg |
| 8,324,602 B2 | 12/2012 | Wiese et al. |

(Continued)

FOREIGN PATENT DOCUMENTS

| DE | 69419305 T2 | 2/2000 |
| DE | 102012107578 A1 | 2/2014 |

(Continued)

OTHER PUBLICATIONS

International Patent Application No, PCT/US2022/035810, filed Jun. 30, 2022, International Search Report/ Written Opinion mailed on Oct. 24, 2022, 10 pages.

*Primary Examiner* — Mary Ellen Bowman
*Assistant Examiner* — Joshua M Carlson
(74) *Attorney, Agent, or Firm* — Mueting Raasch Group

(57) ABSTRACT

A sensor device having a sensor housing and a printed circuit board coupled to the sensor housing. A light emitting device is coupled to the printed circuit board. The light emitting device has an emitter face defining an emission face area. An aperture plate is coupled to the sensor housing, the aperture plate defines an aperture having an aperture area that is less than the emission face area of the emitter face. The aperture is less than 1 mm from the emitter face wherein the light emitting device is not fixed to the aperture plate. A lens is coupled to the sensor housing, having an optical axis extending through the aperture. The aperture plate is positioned between the lens and the emitter face. Boresighting angle variation across sensor components on a manufacturing line may advantageously be reduced without increased cost associated with active alignment. Irradiance drop-out may also be reduced.

23 Claims, 6 Drawing Sheets

(56) References Cited

U.S. PATENT DOCUMENTS

| | | | | |
|---|---|---|---|---|
| 8,730,533 B2* | 5/2014 | Okawa | ............ | H04N 1/12 |
| | | | | 194/207 |
| 2018/0156659 A1* | 6/2018 | Droz | ............ | G01S 17/89 |
| 2018/0172600 A1* | 6/2018 | Wietzorrek | ............ | G03F 7/70225 |
| 2018/0284321 A1* | 10/2018 | Lindmark | ............ | G01V 8/22 |
| 2019/0120962 A1 | 4/2019 | Gimpel et al. | | |
| 2019/0285769 A1* | 9/2019 | Lindmark | ............ | G01V 8/14 |
| 2020/0174169 A1* | 6/2020 | Engelen | ............ | G01J 1/0437 |
| 2020/0383565 A1 | 12/2020 | Gavaris et al. | | |

FOREIGN PATENT DOCUMENTS

| DE | 102016114483 A1 | 2/2018 |
|---|---|---|
| EP | 1574880 B2 | 12/2017 |
| JP | 6236609 B2 | 11/2017 |

\* cited by examiner

PHOTOELECTRIC SENSOR BORESIGHTING IMPROVEMENT

This application claims the benefit of U.S. Provisional Application No. 63/217,455, filed Jul. 1, 2021, the disclosure of which is incorporated by reference herein in its entirety

TECHNOLOGICAL FIELD

The present disclosure is generally related to photoelectric sensors. More particularly, the present disclosure is related to boresighting improvement for photoelectric sensors.

BACKGROUND

Photoelectric sensors generally have a light emitting side and a light receiving side. The light emitting side has a light emitting device such as an LED (light emitting diode) or a laser, and a lens. The light emitting device is positioned on a printed circuit board (PCB) within an outer housing that users mount into a specific application. It is a desirable trait of the sensor that the central axis of the light beam emitted from the sensor (originating from the light emitting device) be correctly aligned with the housing and user mounting features, such as perpendicularly to a front face, or front area, of the housing. The alignment of the emitted light beam relative to the sensor is referred to as boresighting. It is also generally desirable to produce sensors with minimal variation in boresighting so that a user can rely on the sensor housing mounting features and be assured that all sensors' emitted light will hit the desired object without the need for time consuming sensor field alignment through the use of additional bulky tip and tilt mounting brackets.

Typical manufacturing tolerances can stack up and negatively contribute to boresighting variation across sensor devices. Such tolerances may include the following:
1. Between the user mounting surface of the housing and the PCB coupled to the housing;
2. Between the LED and PCB;
3. Between the center of the die emission area of the LED and the center of the LED SMT (surface mount technology) package;
4. Between the mounting surface of the housing and the lens mounting surface; and
5. Between the lens mounting feature and the optical axis of the lens.

Furthermore, a typical emitter side of a photoelectric sensor uses a standard SMT LED that has a bond pad for electrical connection located in the die emission area. (either in a central region or a corner of the die emission area). Some commercially available LEDs have the bond pad located in the center of the die emission area. Some such LEDS have a die emission area that is considered relatively small, such as having a length and width ranging from 200-300 µm. Some other commercially available LEDs have the bond pad located in a corner of the die emission area. Some such LEDs have a die emission area that is considered relatively large, such as having a length and a width ranging from 500-1000 µm. The bond pad may cause an undesirable drop of irradiance in the emitted beam. To avoid an irradiance drop, a point source LED may be used instead of a standard bulk LED, but such devices have a higher cost and may also have boresighting variation based on the tolerances listed above.

SUMMARY

The current technology relates to a photoelectric sensor that may advantageously reduce boresighting variation across sensor devices produced on a manufacturing line. In some embodiments, the photoelectric sensor may reduce the contribution of one or more manufacturing tolerances listed above, or other manufacturing tolerances not listed above, to the boresighting variation. Furthermore, some examples of the current technology reduce irradiance drop-out of the light emitting device that is typically caused by the structure of the LED bond pad.

Some embodiments of the current technology relate to a sensor device. The sensor device has a sensor housing. A printed circuit board is coupled to the sensor housing. A light emitting device is coupled to the printed circuit board, where the light emitting device has an emitter face defining an emission face area. An aperture plate is coupled to the sensor housing. The aperture plate defines an aperture having an aperture area that is less than the emission face area of the emitter face. The aperture is less than 1 mm from the emitter face in an axial direction. The light emitting device is not fixed to the aperture plate. A lens is coupled to the sensor housing. The lens has an optical axis extending through the aperture. The aperture plate is positioned between the lens and the emitter face.

In some such embodiments, the light emitting device has a light emitting diode (LED). Additionally or alternatively, the aperture has a diameter that is at least 200 µm less than a cross dimension of the emission face area. Additionally or alternatively, the aperture is less than 700 µm from the emitter face. Additionally or alternatively, the aperture is in a spaced relationship from the emitter face. Additionally or alternatively, the sensor device has an encapsulation material encapsulating the emitter face. Additionally or alternatively, the aperture is spaced from the encapsulation material by 300 µm or less. Additionally or alternatively, the light emitting device has an emitter axis extending perpendicularly to the emission face area and the lens defines an optical axis extending perpendicularly to the aperture area, and the optical axis is not colinear with the emitter axis.

Additionally or alternatively, the aperture defines an aperture axis extending perpendicularly to the aperture area, and the sensor device has a registration structure configured to align the aperture axis and the optical axis of the lens. Additionally or alternatively, the emission face area of the emitter face has a cross-dimension of at least 400 µm. Additionally or alternatively, the aperture defines an aperture axis extending perpendicularly to the aperture area and the lens has an optical axis that is substantially colinear with the aperture axis.

Some embodiments relate to a sensor device having a sensor housing. A printed circuit board is coupled to the sensor housing. A light emitting device is coupled to the printed circuit board, where the light emitting device has an emitter face defining an emission face area and an emitter axis extending perpendicularly to the emission face area. An aperture plate is coupled to the sensor housing. The aperture plate defines an aperture having an aperture area and an aperture axis extending perpendicularly to the aperture area. The aperture axis is not colinear with the emitter axis. A lens is coupled to the sensor housing, where the aperture plate is positioned between the sensor housing and the emitter face.

In some such embodiments, the aperture is less than 1 mm from the emitter face. Additionally or alternatively, the aperture is less than 700 µm from the emitter face. Additionally or alternatively, the aperture area is less than the emission face area. Additionally or alternatively, the lens has an optical axis that is substantially colinear with the aperture axis. Additionally or alternatively, the light emitting device is not fixed to the aperture plate.

Additionally or alternatively, the aperture has a diameter that is at least 200 μm less than a cross dimension of the emission face area. Additionally or alternatively, an encapsulation material encapsulates the emitter face. Additionally or alternatively, the aperture is spaced from the encapsulation material by 300 μm or less. Additionally or alternatively, a registration structure couples the aperture plate to the lens. Additionally or alternatively, the emission face area of the emitter face has a cross-dimension of at least 400 μm. Additionally or alternatively, the lens has an optical axis that is substantially colinear with the aperture axis. Additionally or alternatively, the aperture is in a spaced relationship with the emitter face.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

The current disclosure is generally directed to a sensor device configuration that may advantageously reduce boresighting variation across the sensor population without active alignment of the light emitting device and the lens. "Active alignment" is manual alignment of the components and securing the components while monitoring one or more real-time performance metrics (such as boresighting angle). Such a configuration may reduce cost and labor associated with manufacturing such devices. Furthermore, sensor devices consistent with the technology disclosed herein may be manufactured with standard bulk or thin-film LEDs and may advantageously reduce or eliminate irradiance drop-out that is typically associated with such LEDs due to their bond pad metallization.

DEFINITIONS

"Cross dimension" is defined as the maximum distance across a particular area in a plane, such as a diagonal or diameter measurement.

"Optical axis" is defined as the central axis through a lens.

"Aperture axis" is defined as the central axis through an aperture in a plane perpendicular to an aperture area of the aperture.

"Axial direction" is the direction parallel to the optical axis x.

"Lateral direction" encompasses the directions in a plane perpendicular to the optical axis x.

"Lateral alignment" is defined as alignment in the direction perpendicular to the optical axis.

"Substantially colinear" generally means that the axes are within 50 μm of each other in the lateral direction.

"Not colinear" generally means that the axes have a spacing greater than 50 μm in the lateral direction.

"Emitter face" is defined as a surface of a light emitting device that is configured to emit light towards a lens. The emitter face is generally perpendicular to an optical axis of the lens. It should be understood that there may be additional surfaces of the light emitting device that are configured to emit light (such as the side surfaces of the light emitting device), but for purposes of the disclosure herein, such additional surfaces are not considered to be the "emitter face".

Figure 1:
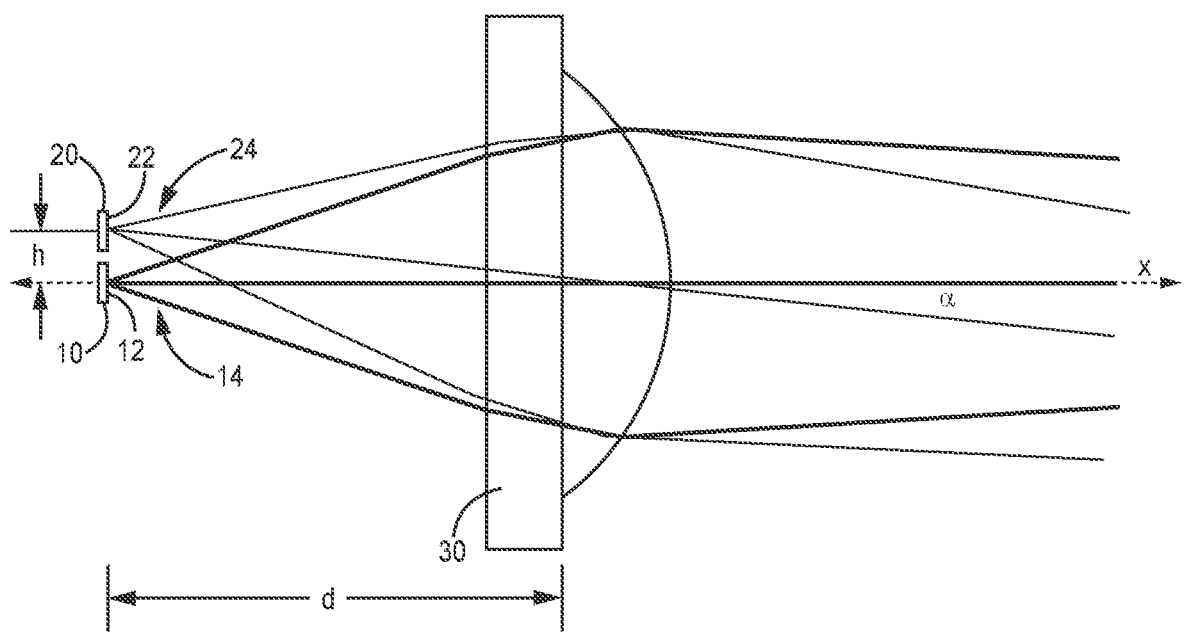
FIG. 1 is a schematic representation demonstrating boresighting angle.
Figure 2:
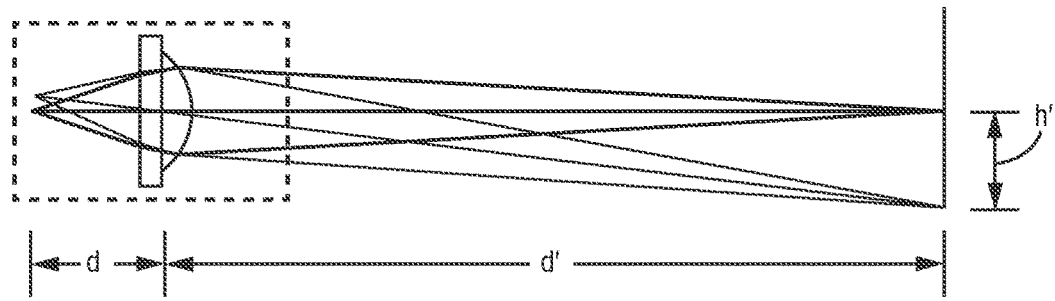
FIG. 2 is a wide-angle view of a schematic representation of a system consistent with FIG. 1.

FIG. 1 is a schematic example demonstrating boresighting variation based on the differing position of comparative light emitting devices 10, 20 relative to a lens 30 of a sensor device. This example shows one main contribution to variations in boresighting angle, but other factors will generally contribute to such variations as well. A first light emitting device 10 has an emitter face 12 in lateral alignment with the optical axis x of the lens 30, meaning that an emitter axis of the emitter face 12 is aligned with the optical axis x of the lens 30. A second light emitting device 20 has an emitter face 22 offset from lateral alignment with the optical axis x of the lens 30 by distance h. Each emitter face 12, 22 is spaced an object distance d from the lens 30. Light emitted 14 by the first emitter face 12 passes centrally through the lens 30, while light emitted 24 by the second emitter face 22 passes through the lens 30 at a boresighting angle α. The boresighting angle α impacts how the system external to the sensor should be configured for sensor operation. A boresighting angle α of zero (or close to zero) provides a user with predictability when setting up such systems and avoids system reconfiguration associated with an unexpected boresighting angle. FIG. 2 is a wider angle view of the schematic example of FIG. 1 and demonstrates the resulting offset h' between the emitted signals at the image distance d' based on the boresighting angle.

As described earlier herein, manufacturing tolerances impact the lateral alignment of the emitter face 12, 22 with the optical axis x of the lens 30. For example, the light emitting device 10 is typically mounted to a PCB and there are manufacturing tolerances associated with the precise position of the light emitting device on the PCB. As another example, in the manufacturing of the light emitting device 10, there are manufacturing tolerances associated with the precise position of the emitter face 12 relative to the rest of the components of the light emitting device 10 (such as the SMT packaging components of an LED). As a further example, in the manufacturing of a sensor device with the light emitting device 10 and the PCB, there are manufacturing tolerances associated with the precise position between the PCB and a sensor housing. These factors are examples that "stack" to cumulatively contribute to boresight variation across sensor devices.

Figure 3:
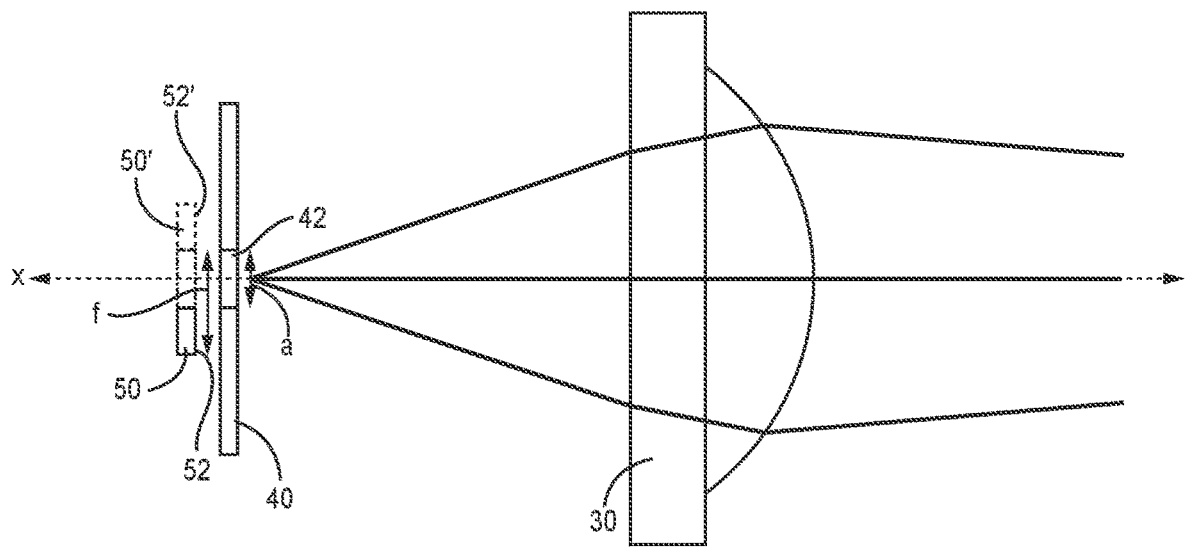
FIG. 3 is a schematic representation of a device consistent with the present technology.

FIG. 3 is a schematic example consistent with the technology disclosed herein, where an aperture plate 40 defining an aperture 42 is positioned between the light emitting device 50, 50' having an emitter face 52, 52' and the lens 30. The light emitting device 50, 50' is shown having two different lateral positions (also represented by element numbers 50, 50') relative to the lens 30. As such, the aperture 42, which modifies the light waves from the light emitting device 50, 50' (for example, by narrowing the field of view), is the direct source of light to the lens 30. Because of this structure, the lateral alignment of the aperture 42 with the optical axis x of the lens 30 dictates the boresighting angle, contrary to configurations described above with reference to FIGS. 1-2 where the lateral alignment of the emitter face dictates the boresighting angle. As such, the lack of precise lateral alignment between the optical axis x of the lens 30 and the emitter face 52, 52' has less of an impact on the boresighting angle, meaning that those tolerances contributing to the lack of lateral alignment between the emitter face 52 and the optical axis x of the lens 30, such as those discussed above, have less of a negative impact on the boresighting angle. As depicted in FIG. 3, there is no practical difference in the boresighting angle based on either lateral position of the light emitting device 50, 50'.

Because the lateral alignment of the aperture 42 with the lens 30 defines the boresighting angle, the tolerance associated with that lateral alignment should generally be relatively small. Furthermore, the sensors consistent with the current technology can be designed such that there are relatively fewer manufacturing tolerances (such as having a single manufacturing tolerance) between the aperture 42 and the lens 30, preventing a "stacking up" of tolerances that cumulatively contribute to lateral misalignment.

The emitter face 52 has an emission face area f, and the aperture 42 has an aperture area a that is less than the emission face area f. The aperture 42 is configured to narrow the field of view of the light emanating from the emitting device 50. Such a configuration allows variations in lateral alignment between the emitter face 52 and the lens 30 without negatively impacting the boresighting angle. As such, existing relatively low-cost manufacturing approaches resulting in relatively high manufacturing tolerances can be used for aligning and securing the light emitting device 50 relative to the lens 30 while reducing boresighting variation across sensor devices manufactured on the same line.

Figure 4:
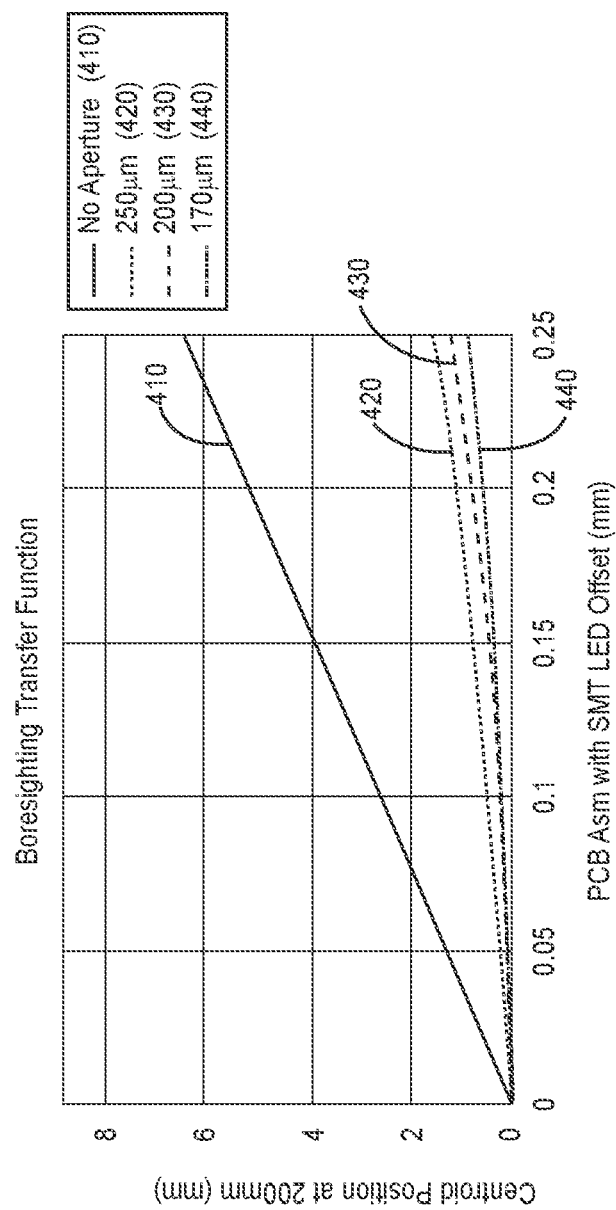
FIG. 4 is a graph demonstrating boresighting angle.

FIG. 4 depicts both simulated and experimental test results demonstrating the improved (reduced variation in) boresighting angle on the emitter side of a sensor device as the result of introducing a field-of-view-limiting aperture, as described above, between a lens and a light emitting device. Each of the devices uses an SMT LED with an equally sized emitter face (480 μm×480 μm) and bond pad, and each of the devices had the same effective focal length (7.7 mm). Each of the devices is described with reference to the schematic components depicted in FIG. 3. A first device 410 is generally consistent with FIG. 3 except it does not incorporate an aperture plate 40 with an aperture 42 between the emitter face 52 and the lens 30. A second device 420, third device 430, and fourth device 440 are all consistent with the schematic of FIG. 3. Each device has an aperture plate 40 defining an aperture 42 that is positioned between the emitter face 52 and the lens 30, where the aperture 42 is spaced 530 μm from the emitter face 52. Each device has encapsulation material over the emitter face 52 (which is not depicted in FIG. 3, but is described below with reference to FIG. 5A). In the second device 420 the aperture 42 is 250 μm in diameter. In the third device 430 the aperture is 200 μm in diameter. In the fourth device 440 the aperture is 170 μm in diameter.

The x-axis of the graph in FIG. 4 reflects the lateral offset between the optical axis of the lens and the emitting axis of the emitting face. The y-axis reflects the offset of the centroid, which is the weighted center of the emitted light at 200 mm from the lens, from the optical axis of the lens. The offset of the centroid corresponds to the boresighting angle. As is visible from the data, introducing an aperture that limits the field of view of the emitter face notably decreases the variation in boresighting angle. While the particular diameter of the aperture may impact the boresighting angle variation, such impact may be considered relatively minimal according to the current data.

Returning to FIG. 3, because the aperture area a is less than the emission face area f of the emitter face 52, the aperture 42 reduces the power transmitted to the lens 30 from the emitter face 52, 52', which is demonstrated in Table 1, below.

Table 1 below shows a comparison of the optical efficiency of each of the experimentally compared devices described above with reference to FIG. 4. The optical efficiency is a measure of the optical power exiting the sensor device divided by the optical power exiting the light emitting device. The data below demonstrates that, as described above, introducing an aperture between the emitter face and the lens reduces the amount of power that is transmitted to the lens from the emitter face. Furthermore, introducing a space between the aperture and the emitter face also reduces the amount of power that is transmitted to the lens from the emitter face (compare second device with fourth device, for example). Furthermore, the size of the aperture also contributes to the optical power efficiency of the emitter of a sensor device.

TABLE 1

| Device | Aperture Size | Distance from Aperture to E-Face | Optical Power Efficiency |
|---|---|---|---|
| First Device 410 | None | N/A | 6.8% |
| Second Device 420 | 250 μm | 200 μm | 2.03% |
| Third Device 430 | 200 μm | 200 μm | 1.36% |
| Fourth Device 440 | 170 μm | 200 μm | 1.00% |

To generate emitter side power sufficient for use in some sensor systems, it may be desirable to configure the emitting side of the sensor device to at least partially offset the reduction in power caused by introducing a field of view limiting aperture between the emitter face and the lens. For example, referring back to FIG. 3, a light emitting device 50 can be used that has relatively higher power output than devices omitting an aperture plate 40 with an aperture 42. In example implementations where the light emitting device is an LED, relatively higher power output is achieved when the LED has a relatively larger emitter face 52 and/or a higher drive current. As another example, the distance between the emitter face and the aperture 42 can be reduced. As another example, increasing the overlap between the aperture 42 and the emitter face 52 in the lateral direction can increase the power that the aperture transmits from the emitter face 52 to the lens 30. In various implementation, the aperture area a at least partially overlaps with the emitter area f in the lateral direction. In some such implementations, it is desirable for the aperture area a to completely overlap with the emitter area f in the lateral direction. Increasing the size of the emitter face 52 generally increases the likelihood that there is at least partial overlap in the lateral direction between the emitter face 52 and the aperture 42. As such, increasing the size of the emitter face 52 also increases the acceptable tolerances associated with the lateral alignment of the emitter 50 relative to the lens 30 (and aperture 42).

In various embodiments the sensor device has a receiver portion that is configured to receive an optical signal from the emitter portion. Correspondingly, it may be desirable to configure a corresponding receiver side of a sensor device to partially offset the reduction in emitted power that is caused by introduction of a field of view limiting aperture between the emitter face and the lens. For example, increasing the sensitivity of the receiver may partially offset the relatively reduced power of the light emitted by the emitter side.

Figure 5A:
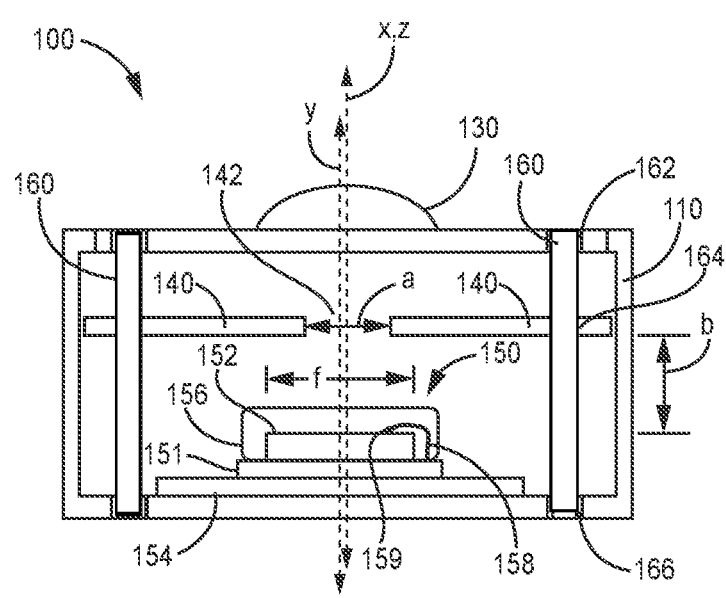
FIG. 5A is a schematic representation of an example emitter portion of a photoelectric sensor consistent with some embodiments.

FIG. 5A is a schematic representative of a cross-section of an example sensor device consistent with various embodiments. The sensor device 100 can be consistent with an emitter portion of a photoelectric sensor system or device. The sensor device 100 generally has a sensor housing 110, a light emitting device 150, an aperture plate 140 defining an aperture 142, and a lens 130 having an optical axis x. The sensor device 100 has a configuration that reduces boresighting angle variation across multiple sensor devices in a single manufacturing line. In some implementations, the sensor device 100 has a reduced boresighting angle compared to comparable available sensor devices.

The light emitting device 150 is generally configured to emit light. The light emitting device 150 can be coupled to a printed circuit board 154 that is coupled to the housing 110. The printed circuit board 154 can generally be consistent with printed circuit boards 154 known in the art. The printed circuit board 154 is disposed in the housing 110, in various examples. The light emitting device 150 is disposed in the housing 110.

The light emitting device 150 has an emitter face 152 defining an emission face area f, although in the current view only one dimension of the emission face area f is visible.

The light emitting device 150 can be consistent with various light emitting devices known in the art. In some examples the light emitting device is a light emitting diode (LED). In some examples the LED is a standard bulk or thin-film surface mount technology (SMT) LED. In such an example, the light emitting device 150 can be mounted to an LED substrate 151, which is mounted to the printed circuit board 154. In such an example, a wire 158 may couple the emitter face 152 of the light emitting device 150 to an electrical power source via the LED substrate 151 and/or the PCB 154. A bond pad 159 can be positioned on the emitter face 152 that couples the wire 158 to the PCB 154. As such, the emitter face 152 may be partially obstructed by the bond pad 159 and the wire 158. However it is noted that, for purposes of determining the emission face area f of the emitter face 152, the wire 158 and bond pad 159 partially obstructing the emission face area f is generally disregarded. Furthermore, for purposes of the calculations herein the emission face area f of the emitter face 152 is generally the area of the surface of the light emitting device that is configured to emit light in an axial direction towards the lens and parallel to the optical axis x. It is possible that other surfaces may also be configured to emit light.

The light emitting device 150 has an emitter axis y extending perpendicularly to the emission face area f. The emitter axis y is positioned centrally through the emission face area f of the emitter face 152. The emitter axis y is generally perpendicular to the emitter face 152 and parallel to the optical axis x. The size of the emission face area f of the emitter face 152 is not particularly limiting and can generally be sized in accordance with the particular application within which the sensor device 100 is configured for use. In some implementations, the emission face area f of the emitter face 152 is less than 4 mm$^2$, although larger emitter faces 152 are certainly contemplated. In some embodiments the emission face area f of the emitter face 152 is less than or equal to 1 mm$^2$. In various implementations the cross dimension of the emission face area f of the emitter face 152 is at least 400 µm.

In some implementations of the light emitting device 150, an encapsulation material 156 encapsulates the emitter face 152 of the light emitting device 150 over the LED substrate 151. Such a configuration may be configured to provide protection to one or more of the light emitting device 150, the wire 158, and the bond pad 159. Some embodiments omit an encapsulation material 156, however. While the encapsulation material 156 can provide protection to the light emitting device 150, it can also, depending upon the material used, increase, reduce or maintain the intensity of light passing through the aperture 142 and, therefore, the lens 130.

The aperture plate 140 is generally coupled to the sensor housing 110. Generally, the aperture plate 140 is not directly coupled to the light emitting device 150. In various embodiments, the light emitting device 150 is not fixed to the aperture plate 140. The position of the light emitting device 150 in the sensor device 100 is not limited by the aperture plate 140. Such a configuration may advantageously accommodate variations in lateral alignment between the light emitting device 150 (more particularly, the emitter axis y) and the aperture 142 (more particularly, an aperture axis z).

In some embodiments, the aperture plate 140 defines the aperture 142 in a spaced relationship with the emitter face 152 in the axial direction. In some other embodiments, the aperture plate 140 and the emitter face 152 can be in direct contact. Such configurations will be discussed in more detail, below.

The aperture 142 has an aperture area a (only one dimension of which is visible in FIG. 5A). The aperture area a is perpendicular to the optical axis x. The aperture area a is parallel to the emitter face 152. The aperture area a is generally less than the emission face area f of the emitter face 152. Such a configuration may advantageously accommodate lateral misalignment between the aperture and the emitter face 152 without impacting boresighting angle. The aperture 142 can be circular in various embodiments, but alternate shapes are also contemplated.

The aperture area a of the aperture 142 is sized to balance sufficient power transmission from the light emitting device 150 to the lens 130 with allowing lateral alignment tolerances between the aperture 142 and the emitter face 152 (within which sufficient power transmission from the light emitting device to the lens 130 is achieved). As such, the minimum size of the aperture area a is generally limited by the minimum desired power transmission through the aperture area a in view of other factors such as the power of the emitter face 152 itself and the distance between the aperture 142 and the emitter face 152. The maximum size of the aperture area a is generally the maximum size that limits the field of view of the emitter face 152 and that results in sufficient lateral overlap between the aperture 142 and the emitter face 152 to result in sufficient power transmission across the manufacturing tolerances defining lateral alignment between the aperture and the emitter face 152. In some embodiments, the aperture 142 has a diameter that is around 200 μm less than the cross dimension across the emission face area f of the emitter face 152. In some examples, where the emission face area f of the emitter face 152 has a cross dimension ranging from 100 μm to 1 mm, the aperture 142 has a diameter ranging from 100 μm to 300 μm. In one specific example, the aperture has a diameter of about 170 μm.

The aperture 142 is generally less than 1 mm from the emitter face 152 in the axial direction. In some embodiments, the aperture 142 is less than 700 μm from the emitter face 152. When the distance b between the aperture 142 and the emitter face 152 is too great, light emitted from the light emitting device 150 through the aperture 142 does not adequately fill the lens 130, which results in inadequate power emission (or too small of a beam size) from the emitter side of the sensor device 100. Inadequate power emitted from the sensor device 100 can prevent adequate sensing from a receiver side of the sensor device. In some embodiments the aperture 142 is 700 μm or less from the emitter face 152. In an example, the aperture plate 140 makes contact with the emitter face 152 such that the distance b between the aperture 142 and the emitter face 152 is zero. However, in such embodiments, the aperture 142 and the emitter face 152 are uncoupled. In some embodiments the aperture 142 is spaced 300 μm to 700 μm from the emitter face 152. In embodiments incorporating the encapsulation material 156, the minimum distance between the aperture 142 and the emitter face 152 can be the thickness of the encapsulation material 156 between the aperture 142 and the emitter face 152. In some embodiments, the aperture 142 is 600 μm or less from the encapsulation material 156.

In various embodiments, the aperture 142 defines the aperture axis z extending perpendicularly to the aperture area a. The aperture axis z extends centrally through the aperture 142. In the current example, the aperture axis z and the optical axis x are laterally aligned and are, therefore, represented by a single line in FIG. 5A. In various implementations, however, the aperture axis z is not colinear with the optical axis x. The spacing of the aperture axis z and the optical axis x can result from the manufacturing tolerances associated with assembling the light emitting device itself, assembling the light emitting device on the PCB, and assembling the PCB and the housing 110.

The lens 130 is generally coupled to the sensor housing 110 such that the aperture plate 140 is positioned between the lens 130 and the emitter face 152. The lens 130 defines the optical axis x extending through the aperture 142.

In various embodiments, a registration structure 160 is used to laterally align the lens 130 and the aperture 142 which, in turn, results in substantial colinearity between the optical axis x of the lens 130 and the aperture axis z. The aperture plate 140 can have a plate mating structure 164 that is configured to receive the registration structure 160. Furthermore, the lens 130 can have a lens mating structure 162 that is configured to receive the registration structure 160. In some embodiments, the registration structure 160 is two or more pins (also element 160), and the lens mating structure 162 and the plate mating structure 164 are corresponding pin openings (also elements 162, 164, respectively), which each receive one of the two or more pins 160.

While manufacturing tolerances do impact the lateral alignment between the optical axis x and the aperture axis z, in various implementations there are fewer manufacturing tolerances that cumulatively contribute to lateral misalignment between the lens 130 and the aperture 142 compared to the number of manufacturing tolerances that cumulatively contribute to lateral misalignment between the emitter axis y and the optical axis x, and between the emitter axis y and the aperture axis z. In one example implementation, the lateral distance between the optical axis x and the aperture axis z is 50 μm or less, while the lateral distance between the optical axis x and the emitter axis y is 200 μm or less. Further, the lateral distance between the aperture axis z and the emitter axis y can be 200 μm or less. Larger lateral distances between the emitter axis y and the aperture axis z and/or the optical axis x are possible where the emitter face area f is relatively larger, however.

In some embodiments the registration structure 160 is a component of the sensor housing 110. In some examples, the registration structure 160 is a separate component that is coupled to the housing 110. For example, the housing 110 can define a housing mating structure 166 configured to mate with the registration structure 160. In this example, the housing mating structure 166 can be pin openings, that are each configured to receive a pin of the two or more pins 160. In some other embodiments the registration structure 160 and the housing 110 are a single, unitary component.

Various other configurations of the registration structure are also contemplated. In some embodiments, the lens 130 can define the registration structure that is configured to receive a mating structure of the aperture plate 140. In some other embodiments, the aperture plate 140 defines the registration structure that is configured to receive a mating structure of the lens 130.

As described above, in various embodiments, because the aperture 142 reduces the power that is transmitted from the light emitting device 150 to the lens 130 (relative to a device lacking an aperture), it may be desirable to use a light emitting device 150 that has a relatively higher transmission power compared to sensor devices lacking an aperture between the emitter face and the lens. Such a configuration may at least partially compensate for the loss of power to the lens. In various implementations, a light emitting device 150 with a relatively higher power output can be incorporated in the sensor device. In the case of LED light emitting devices, a relatively higher power light emitting device 150 can have a larger emitter face 152, which may further allow relaxation of manufacturing tolerances between the emitter face 152 and the lens 130.

It is noted that, across a large population of sensor devices manufactured consistently with the current technology, because there is a relatively high lateral alignment tolerance between the emitter axis y and the aperture axis z (and/or the optical axis x), many sensor devices among the large population of sensor devices have an emitter axis y that is not colinear with the optical axis x. It will be appreciated, however, that some of the sensor devices among the large population of sensor devices can have an emitter axis y that happens to be colinear with the optical axis x (and/or the aperture axis z). The technology disclosed herein may advantageously reduce or eliminate the boresighting variations across the large population of sensor devices regardless of whether the emitter axis y is colinear with the optical axis x. Such an advantage allows sensor devices having an emitter axis y that is not colinear with the optical axis x to have an acceptable and/or predictable boresighting angle that is consistent with the sensor devices having an emitter axis y that is colinear with the optical axis x.

Figure 5B:
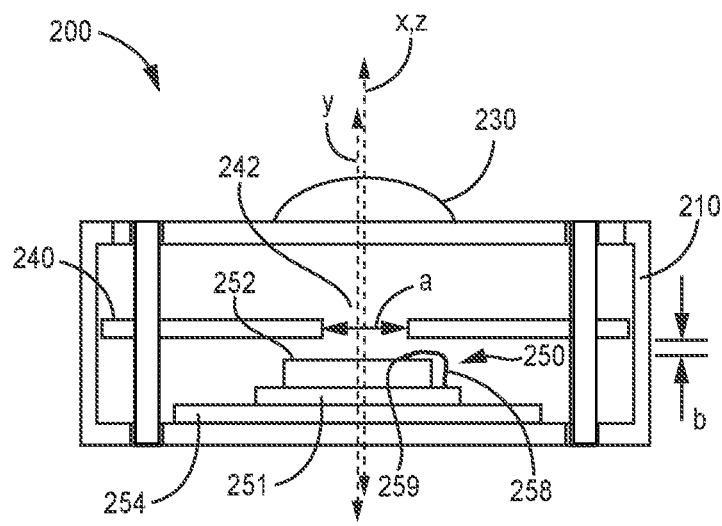
FIG. 5B is a schematic representation of another example emitter portion of a photoelectric sensor consistent with some embodiments.
Figure 5C:
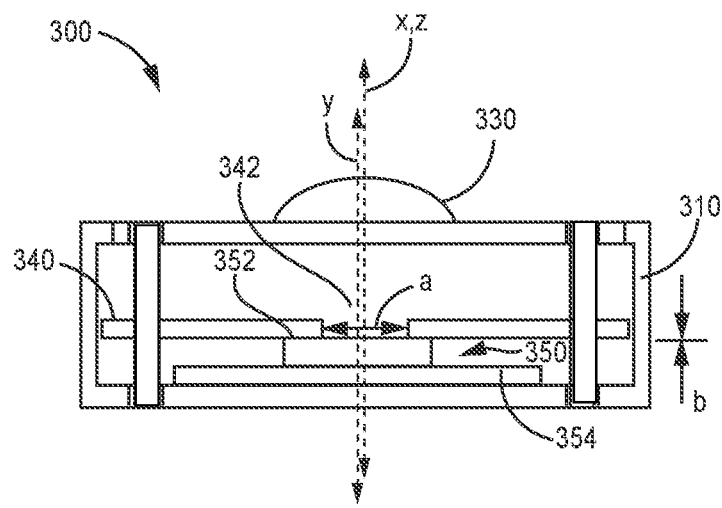
FIG. 5C is a schematic representation of yet another example emitter portion of a photoelectric sensor consistent with some embodiments.
Figure 6:
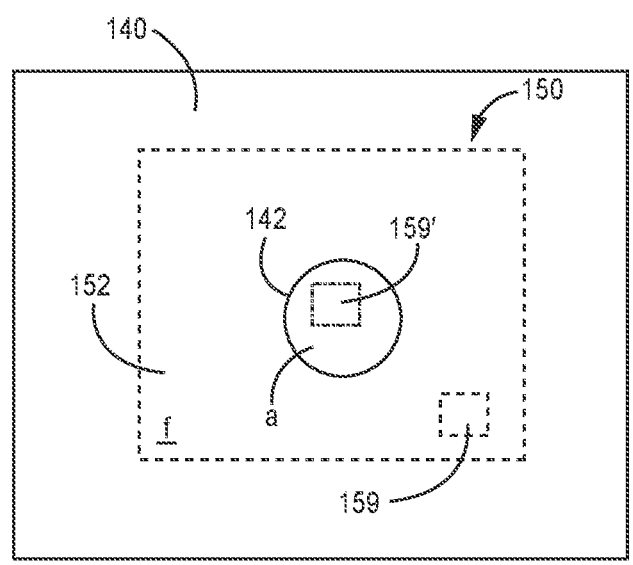
FIG. 6 is a facing view of the example light emitting device and aperture plate.

FIG. 6 depicts a schematic facing view of the aperture plate 140 having an aperture 142 defining an aperture area a that is positioned over a light emitting device 150 having an emitter face 152 (represented in dotted lines), which can be consistent with FIGS. 5A-5C. The light emitting device 150 is configured as a surface mounted thin-film LED. A bond pad 159 is coupled to the emitter face 152. In various commercially-available surface mounted thin-film LEDs, such as those having a relatively small size, the bond pad (such as the bond pad 159') is located centrally to the emitter face. Even partial overlap in the lateral direction between the bond pad 159' and the aperture 142 causes an irradiance drop-out that is transmitted through the aperture 142 which is then transmitted by the lens (such as the lens 130 depicted in FIG. 5A). Such an irradiance drop-out can be particularly undesirable in the current technology, where the power transmitted to the lens from the light emitting device 150 is reduced by the aperture 142.

However, in various examples, the light emitting device 150 is a commercially available surface mounted thin-film LED has the bond pad 159 disposed towards a corner of the emitter face 152. Such a configuration advantageously reduces the likelihood that the aperture 142 and the bond pad 159 will laterally align (despite manufacturing tolerances impacting lateral alignment between the emitter axis y and the aperture axis z such as depicted in FIG. 5A), which therefore reduces the likelihood of an irradiance drop in the beam emitted from the lens. Various commercially available surface mounted thin-film LEDs have such a bond pad configuration. Such a configuration can be associated with LEDs having a cross-dimension of at least 400 μm or 500 μm.

FIG. 5B depicts another example sensor device having a sensor housing 210 with a relatively reduced distance between an emitter face 252 and an aperture 242 in an aperture plate 240. In this example, a light emitting device 250 lacks an encapsulation material disclosed above with reference to FIG. 5A. The minimum distance b between the emitter face 252 and the aperture 242 is equivalent to the minimum clearance necessary to accommodate a bond pad 259 coupled to the emitter face 252 and a wire 258 coupling the bond pad 259 to a substrate 251 in the axial direction between the emitter face 252 and the aperture plate 240. The maximum distance b between the aperture 242 and the emitter face 252 can be dictated by the minimum amount of light that the aperture 242 needs to transmit from the emitter face 252 to the lens 230 to achieve a minimum power output by the emitter side of the sensor device 200. As discussed above, increasing the distance b between the emitter face 252 and the aperture 242 decreases the amount of light that the aperture 242 transmits to the lens 230 from the emitter face 252.

In some embodiments, the substrate 251 may be omitted. In such examples the bond pad 259 can be coupled to the printed circuit board 254.

FIG. 5C depicts yet another example sensor device 300 where the emitter face 352 and the aperture 342 (and, therefore, the aperture plate 340) make contact. In the current example, the light emitting device 350 lacks an encapsulation material (see FIG. 5A), a bond pad (see FIGS. 5A-5B), a wire bond (see FIGS. 5A-5B), and a substrate (see FIGS. 5A-5B). Such a light emitting device 350 can be consistent with a flip chip LED, for example. It is noted that, in such an example, the position of the light emitting device 350 is not defined by the aperture plate 340 or the lens 330.

In various embodiments, the light emitting device 350 and the aperture plate 340 are not directly coupled despite being in direct contact at the emitter face 352. Such a configuration accommodates variations in lateral alignment between the emitter face 352 and the aperture 342.

STATEMENT OF THE EXEMPLARY EMBODIMENTS

Embodiment 1. A sensor device comprising:
a sensor housing;
a printed circuit board coupled to the sensor housing;
a light emitting device coupled to the printed circuit board, wherein the light emitting device has an emitter face defining an emission face area;
an aperture plate coupled to the sensor housing, the aperture plate defining an aperture having an aperture area that is less than the emission face area of the emitter face, and wherein the aperture is less than 1 mm from the emitter face in an axial direction, wherein the light emitting device is not fixed to the aperture plate; and
a lens coupled to the sensor housing, the lens having an optical axis extending through the aperture, wherein the aperture plate is positioned between the lens and the emitter face.

Embodiment 2. The sensor device of any one of embodiments 1 and 3-11, wherein the light emitting device comprises a light emitting diode (LED).

Embodiment 3. The sensor device of any one of embodiments 1-2 and 4-11, wherein the aperture has a diameter that is at least 200 μm less than a cross dimension of the emission face area.

Embodiment 4. The sensor device of any one of embodiments 1-3 and 5-11, wherein the aperture is less than 700 μm from the emitter face.

Embodiment 5. The sensor device of any one of embodiments 1-4 and 6-11, wherein the aperture is in a spaced relationship from the emitter face.

Embodiment 6. The sensor device of any one of embodiments 1-5 and 7-11, further comprising an encapsulation material encapsulating the emitter face.

Embodiment 7. The sensor device of any one of embodiments 1-6 and 8-11, wherein the aperture is spaced from the encapsulation material by 300 μm or less.

Embodiment 8. The sensor device of any one of embodiments 1-7 and 9-11, wherein the light emitting device has an emitter axis extending perpendicularly to the emission face area, and the lens defines an optical axis extending perpendicularly to the aperture area, and wherein the optical axis is not colinear with the emitter axis.

Embodiment 9. The sensor device of any one of embodiments 1-8 and 10-11, wherein the aperture defines an aperture axis extending perpendicularly to the aperture area, and the sensor device further comprises a registration structure configured to align the aperture axis and the optical axis of the lens.

Embodiment 10. The sensor device of any one of embodiments 1-9 and 11, wherein the emission face area of the emitter face has a cross-dimension of at least 400 μm.

Embodiment 11. The sensor device of any one of embodiments 1-10, wherein the aperture defines an aperture axis extending perpendicularly to the aperture area and the lens has an optical axis that is substantially colinear with the aperture axis.

Embodiment 12. A sensor device comprising:
a sensor housing;
a printed circuit board coupled to the sensor housing;
a light emitting device coupled to the printed circuit board, wherein the light emitting device has an emitter face defining an emission face area and an emitter axis extending perpendicularly to the emission face area;
an aperture plate coupled to the sensor housing, wherein the aperture plate defines an aperture defining an aperture area and an aperture axis extending perpendicularly to the aperture area, and wherein the aperture axis is not colinear with the emitter axis; and
a lens coupled to the sensor housing, wherein the aperture plate is positioned between the sensor housing and the emitter face.

Embodiment 13. The sensor device of any one of embodiments 12 and 14-24, wherein the aperture is less than 1 mm from the emitter face.

Embodiment 14. The sensor device of any one of embodiments 12-13 and 15-24, wherein the aperture is less than 700 μm from the emitter face.

Embodiment 15. The sensor device of any one of embodiments 12-14 and 16-24, wherein the aperture area is less than the emission face area.

Embodiment 16. The sensor device of any one of embodiments 12-15 and 17-24, wherein the lens has an optical axis that is substantially colinear with the aperture axis.

Embodiment 17. The sensor device of any one of embodiments 12-16 and 18-24, wherein the light emitting device is not fixed to the aperture plate.

Embodiment 18. The sensor device of any one of embodiments 12-17 and 19-24, wherein the aperture has a diameter that is at least 200 μm less than a cross dimension of the emission face area.

Embodiment 19. The sensor device of any one of embodiments 12-18 and 20-24, further comprising an encapsulation material encapsulating the emitter face.

Embodiment 20. The sensor device of any one of embodiments 12-19 and 21-24, wherein the aperture is spaced from the encapsulation material by 300 μm or less.

Embodiment 21. The sensor device of any one of embodiments 12-20 and 22-24, further comprising a registration structure coupling the aperture plate to the lens.

Embodiment 22. The sensor device of any one of embodiments 12-21 and 23-24, wherein the emission face area of the emitter face has a cross-dimension of at least 400 μm.

Embodiment 23. The sensor device of any one of embodiments 12-22 and 24, wherein the lens has an optical axis that is substantially colinear with the aperture axis.

Embodiment 24. The sensor device of any one of embodiments 12-23, wherein the aperture is in a spaced relationship with the emitter face.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A sensor device comprising:
a sensor housing;
a printed circuit board coupled to the sensor housing;
a light emitting device coupled to the printed circuit board, wherein the light emitting device has an emitter face defining an emission face area;
an aperture plate coupled to the sensor housing, the aperture plate defining an aperture having an aperture area that is less than the emission face area of the emitter face, wherein the aperture is less than 1 mm from the emitter face in an axial direction, and wherein the light emitting device is not fixed to the aperture plate; and
a lens coupled to the sensor housing, the lens having an optical axis extending through the aperture, wherein the aperture plate is positioned between the lens and the emitter face, and wherein the sensor device defines a boresighting angle that is reduced by the aperture plate.

2. The sensor device of claim 1, wherein the light emitting device comprises a light emitting diode (LED).

3. The sensor device of claim 1, wherein the aperture has a diameter that is at least 200 μm less than a cross dimension of the emission face area.

4. The sensor device of claim 1, wherein the aperture is less than 700 μm from the emitter face.

5. The sensor device of claim 1, wherein the aperture is in a spaced relationship from the emitter face.

6. The sensor device of claim 1, further comprising an encapsulation material encapsulating the emitter face.

7. The sensor device of claim 6, wherein the aperture is spaced from the encapsulation material by 300 μm or less.

8. The sensor device of claim 1, wherein the light emitting device has an emitter axis extending perpendicularly to the emission face area, and the optical axis extends perpendicularly to the aperture area, and wherein the optical axis is not colinear with the emitter axis.

9. The sensor device of claim 8, wherein the aperture defines an aperture axis extending perpendicularly from the aperture area, and the sensor device further comprises a registration structure configured to align the aperture axis and the optical axis of the lens.

10. The sensor device of claim 1, wherein the emission face area of the emitter face has a cross-dimension of at least 400 μm.

11. The sensor device of claim 1, wherein the aperture defines an aperture axis extending perpendicularly from the aperture area and the lens has an optical axis that is substantially colinear with the aperture axis.

12. A sensor device comprising:
a sensor housing;
a printed circuit board coupled to the sensor housing;
a light emitting device coupled to the printed circuit board configured to emit light at a particular optical power, wherein the light emitting device has an emitter face defining an emission face area and an emitter axis extending perpendicularly to the emission face area;
an aperture plate coupled to the sensor housing, wherein the aperture plate defines an aperture defining an aperture area and an aperture axis extending perpendicularly from the aperture area, and wherein the aperture axis is not colinear with the emitter axis; and a lens coupled to the sensor housing, wherein the aperture plate is positioned between the sensor housing and the emitter face, wherein the lens has an optical axis that is substantially colinear with the aperture axis, and wherein the aperture plate is configured to reduce the optical power transmitted to the lens from the emitter face.

13. The sensor device of claim 12, wherein the aperture is less than 1 mm from the emitter face.

14. The sensor device of claim 13, wherein the aperture is less than 700 µm from the emitter face.

15. The sensor device of claim 12, wherein the aperture area is less than the emission face area.

16. The sensor device of claim 12, wherein the light emitting device is not fixed to the aperture plate.

17. The sensor device of claim 12, wherein the aperture has a diameter that is at least 200 µm less than a cross dimension of the emission face area.

18. The sensor device of claim 12, further comprising an encapsulation material encapsulating the emitter face.

19. The sensor device of claim 18, wherein the aperture is spaced from the encapsulation material by 300 µm or less.

20. The sensor device of claim 12, further comprising a registration structure coupling the aperture plate to the lens.

21. The sensor device of claim 12, wherein the emission face area of the emitter face has a cross-dimension of at least 400 µm.

22. The sensor device of claim 12, wherein the lens has an optical axis that is not colinear with the emitter axis.

23. The sensor device of claim 12, wherein the aperture is in a spaced relationship with the emitter face.

* * * * *